M. WESTON & A. H. JOHNSON.
COMBINED WEEDER AND SEED-DRILL.

No. 176,909. Patented May 2, 1876.

Witnesses:
Henry Eichling
B. G. Stark

Inventors:
Mason Weston
Albert H. Johnson
By Rich Aleh
Attys.

UNITED STATES PATENT OFFICE.

MASON WESTON AND ALBERT H. JOHNSON, OF PONTIAC, MICHIGAN.

IMPROVEMENT IN COMBINED WEEDERS AND SEED-DRILLS.

Specification forming part of Letters Patent No. 176,909, dated May 2, 1876; application filed September 9, 1875.

*To all whom it may concern:*

Be it known that we, MASON WESTON and ALBERT H. JOHNSON, both of Pontiac, Oakland county, State of Michigan, have invented an Improved Combined Weeder and Seed-Drill, of which the following is a specification, reference being had to the accompanying drawings, forming part hereof.

Our invention consists in the combination, with the devices constituting the seed-drill hereinafter specified, of a weeder-knife of the form and arrangement hereinafter particularly described, and it is intended to be used in planting all kinds of small seeds, such as turnips, onions, &c., and adapted to be arranged to weed vegetables of all kinds, strawberries, and garden produce generally planted in rows.

Figure 1:
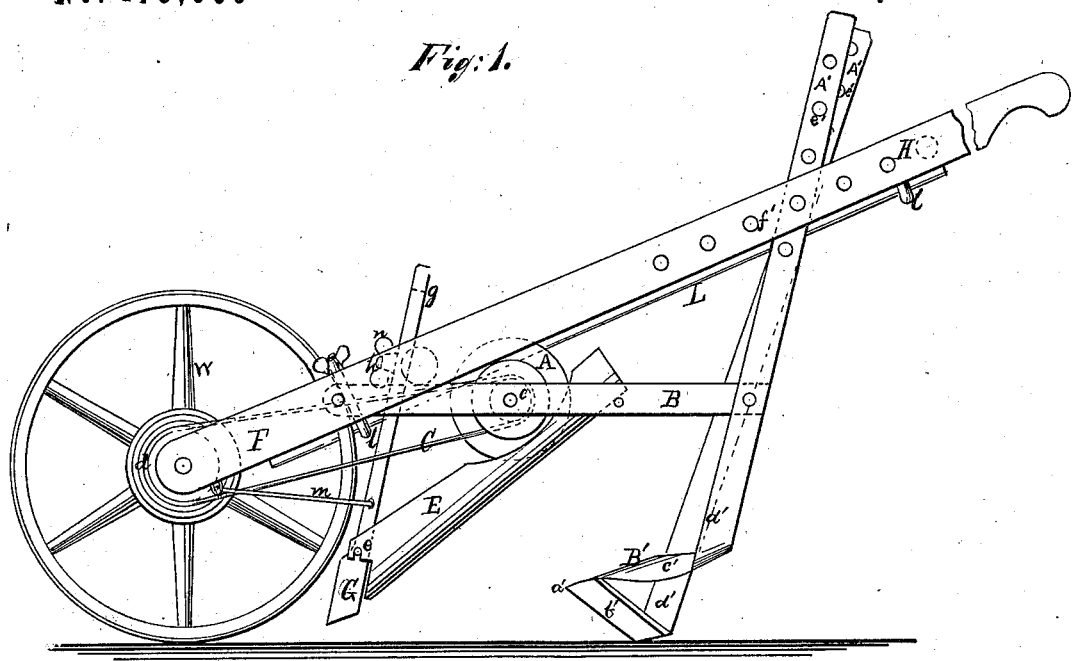
Figure 2:
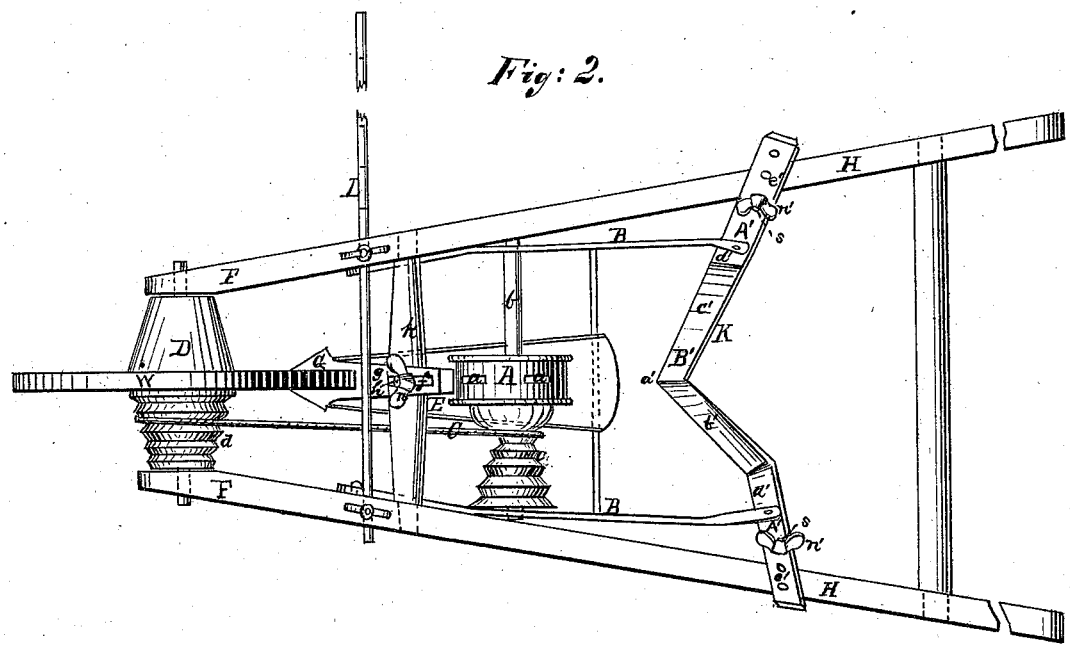

Figure 1 is a side elevation of our combined weeder and seed-drill, showing the parts adjusted for the operation of weeding. Fig. 2 is a plan of the same, showing the parts adjusted for the operation of planting seed.

A is the drill-box, constructed with one-half of the rim of the box sleeved into the other, and provided with the series of slotted openings $a$ through the rims, whereby the openings are adjustable to the size of the seed or the quantity desired to be dropped from each opening during the revolution of the box. The said box is cylindrical in form, and is fixed on the axle-shaft $b$, which has bearings in the braces B, as shown, and is revolved at a desired rate of speed by the belt C running over the cone-pulley $c$ on the said shaft $b$ and the cone-pulley $d$ formed on the hub D of the wheel W, which revolves in bearings in the front of the frame F, as shown. E is a trough or chute, which is sustained under the box A, and conveys the seed dropped by said box to the furrow made by the marker G. The said marker is attached to the chute at $e$, as shown, and is adjustable to mark a deep or shallow furrow, as desired, or to be raised above the ground, by means of the slotted opening $f$ in its beam $g$, which works on the screw-pin $h$ set in the cross-brace $k$, and provided with the thumb-nut $n$. The beam $g$ is suitably braced at $m$, as shown. L is a gage-rod, which is conveniently carried when the machine is operated as a weeder, under one of the handles, resting in the eyes $l$, as shown in Fig. 1; and, when the machine is operated as a drill, is adjusted as shown in Fig. 2, extending to the right of the operator, and, being marked with equal spaces, as shown, enables the operator to drop the seed in parallel rows, which are equidistant from each other.

K is the weeder-knife, which is formed, as shown, with the transverse blade B′, having the angle or point $a'$, and with the portion $b'$ of said blade carried obliquely upward, and the portion $c'$ carried obliquely downward from said angle, as shown, and having the upright blades $d'$, one on either side. The knife is carried by the long arms A′, which are braced by the braces B, and are provided with the openings $e'$, as shown, which fit over screw-pins $s$ set in the openings $f'$ in the handles H, and provided with the thumb-nuts $n'$, whereby the knife is adjustable to suit the height of the operator and the depth and direction of the cut.

By means of the form given to the knife K, the transverse blade operates with a draw-cut against the weeds, instead of a direct pressure, while the upright side blades $d'$ operate to cut away creeper-weeds, such, for instance, as infest strawberry-beds.

When the machine is in operation as a drill the parts are adjusted in position shown in Fig. 2, and the knife K then operates as a shovel to cover the seed dropped in the furrow by the drill device.

When the machine is operated as a weeder, the parts are adjusted in the position shown in Fig. 1, the marker G being raised above the ground, and the revolution of the drill-box stopped. The knife K then acts to cut and uproot the weeds and scarify the ground.

We are aware that the adjustable sleeved drill-box A is not new, and also that the chute E has been heretofore known and used. We do not intend to claim either of these devices broadly, but to limit our claim to them in combination with the specific parts and devices herein shown and described—that is to say, with the cone-pulley $c$, the belt C, the cone-pulley $d$, the adjustable marker G, and the weeder-knife K, which performs the double function of weeder and coverer of the seed, together with the gage-rod L, all co-operating together, as set forth.

What we claim as our invention, and desire to secure by Letters Patent, is—

1. The adjustable weeder-knife K, having the transverse blade B', with its angle $a'$, and inclined portions $b'$ and $c'$, and upright blades $d'$, as described.

2. The combination of the adjustable drill-box A, cone-pulleys $c$ $d$, belt C, chute E, adjustable opener G, with the adjustable knife K, as described.

MASON WESTON.
ALBERT H. JOHNSON.

Witnesses:
Jos. E. SAWYER,
EDWARD C. SMITH.